Aug. 3, 1965     E. BITTNER     3,198,198
CORN AND CALLOUS FILE
Filed Nov. 24, 1961
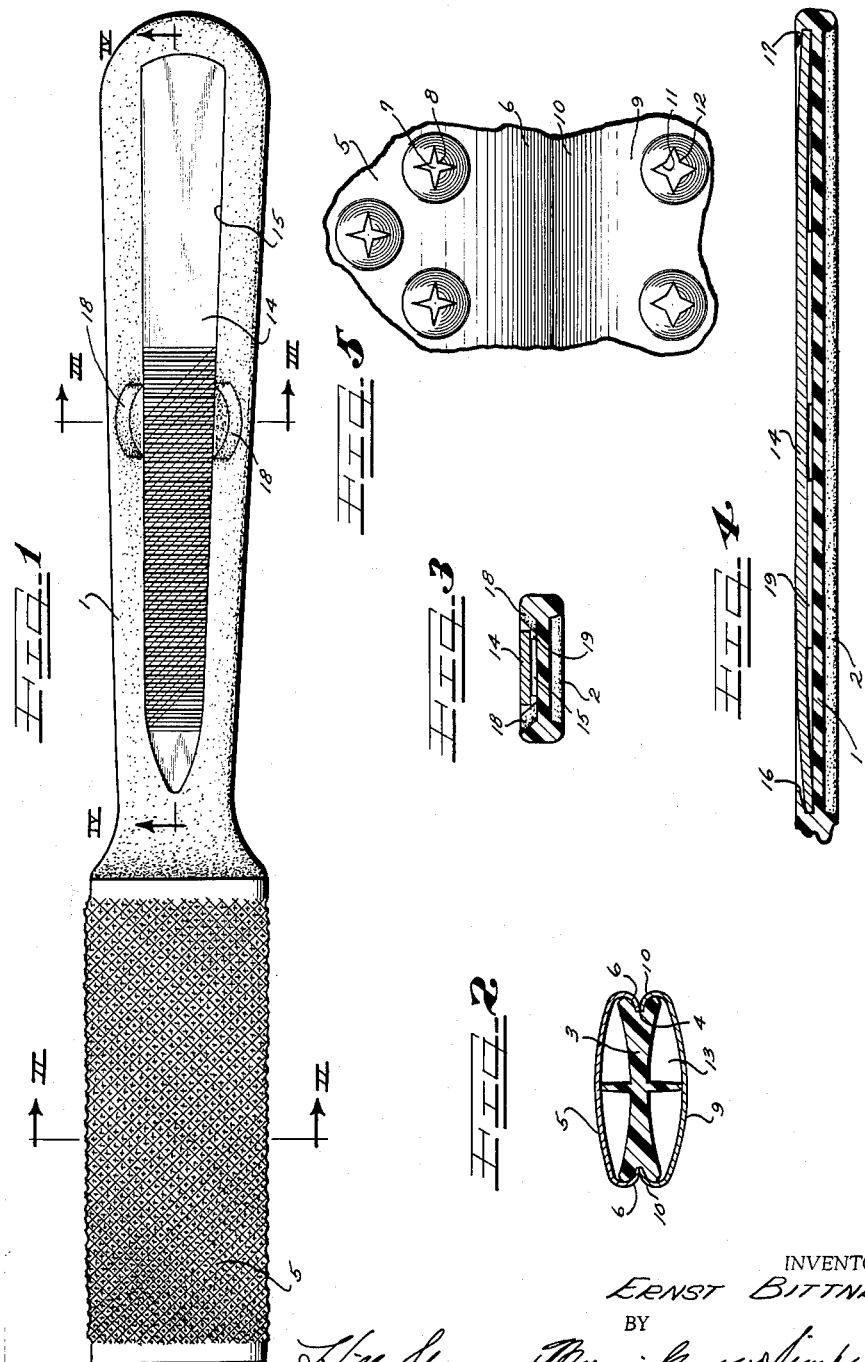
INVENTOR.
ERNST BITTNER
BY
ATTORNEYS

United States Patent Office 3,198,198
Patented Aug. 3, 1965

3,198,198
CORN AND CALLOUS FILE
Ernst Bittner, Frankfurt am Main, Germany, assignor to The Scholl Mfg. Co., Inc., Chicago, Ill., a corporation of New York
Filed Nov. 24, 1961, Ser. No. 154,774
3 Claims. (Cl. 132—76.4)

This invention relates to improvements in a corn and callous file, highly desirable for reduction of corn and callous tissue, horny tubercles of the skin, horny indurations, thickening of the skin, and similar afflictions where relief might be obtained by removal of the outer tissue at the affliction, although the device will have other uses and purposes as will be apparent to one skilled in the art.

In the past, many and various types of corn and callous files have been developed, but have proven objectionable and disadvantageous for a number of reasons. Perhaps the greatest objection to files of this character heretofore developed resided in the fact that the files could not be adequately cleansed after usage. Another disadvantage of formerly known files of this type was the lack of varying degrees of coarseness in the filing area proper so as to enable one to select a relatively coarse or a fine cutting surface for the proper and painless reduction of the extra tissue. Previously known files were also frequently relatively short lived, lacking the desired durability, as well as ofttimes being objectionably expensive.

With the foregoing in mind, it is an important object of this invention to provide a corn and callous file so constructed that the cutting surfaces as well as other parts of the file may readily and easily be cleansed of filings or accumulation of debris at any time desirable.

A further object of the invention resides in the provision of a corn or callous file having a plurality of cutting surfaces of different degrees of coarseness.

Another object of the invention resides in the provision of a corn and callous file so constructed as to be easily manipulated, which carries a plurality of cutting surfaces of different degrees of coarseness, and which has a handle so shaped as to removably carry a common form of nail file.

Another feature of this invention is the provision of a corn and callous file having a skeleton structure for holding the cutting elements whereby an open-ended hollow is provided inside the cutting faces which may readily be cleaned of debris, and the cutting faces may readily be cleaned externally thereof.

Also a feature of the invention is to provision of a corn and callous file shaped for easy manipulation, which is simple in construction, economical, and extremely durable.

While some of the more salient features, characteristics and advantages of the instant invention have been above pointed out, others will become apparent from the following disclosures, taken in conjunction with the accompanying drawing, in which:

FIGURE 1 is an enlarged plan view of a corn and callous file embodying principles of the instant invention;

FIGURE 2 is a transverse vertical section through the structure of FIGURE 1 taken substantially as indicated by the line II—II of FIGURE 1, looking in the direction of the arrows;

FIGURE 3 is a transverse vertical section through the handle portion of the device taken substantially as indicated by the line III—III of FIGURE 1;

FIGURE 4 is a fragmentary longitudinal vertical sectional view through the handle portion of the device taken substantially as indicated by the line IV—IV of FIGURE 1; and FIGURE 5 is a greatly magnified fragmentary side view of the forward portion of the structure.

As shown on the drawings:

In the illustrated embodiment of the instant invention there is shown a corn and callous file embodying a handle 1 contoured for easy grasping by the hand of a user and provided with a recess 2 on the underside thereof in which the tips of the fingers may be inserted to steady the device when in use. This handle may well be made of a suitable thermosetting plastic, both for its durability and lightness in weight, but could also be made of other suitable material if desired.

Integral with the forward end of the handle is a skeleton frame 3 having a cross-sectional shape substantially that of a cross fourche but with the notched ends of the vertical arms removed. Preferably, also, the vertical arms of the cross-sectional shape are shorter and thinner than the horizontally extending arms each of which has a longitudinal notch at 4 in its free end. Over the upper side of the skeleton frame 3 is a file element in the form of a curvate sheet 5 having the marginal portions 6–6 thereof bent into the opposed notches in the side arms of the skeleton frame to retain the member 5 in position. This member 5 may economically be made of metal, and stainless steel is preferred. The cutting surface of the member 5 is in the form of a greater and consists of numerous apertures 7 defined each by a plurality of projecting points 8 to provide a predetermined degree of coarseness. These may readily be made by punching the initially smooth plate 5 by way of a knurling machine in a manner to extrude and separate the points defining each of the irregular shaped apertures.

Over the underside of the skeleton frame is a similar cutting member 9 having its marginal portions 10—10 turned into the notches of the cross arms of the skeleton frame into juxtaposition with the margins 6—6 of the other cutting member 5. The cutting member 9 is made in similar manner to the cutting member 5, but the cutting surface is composed of larger apertures 11 defined by adjacent points 12 so that the cutting member 9 is coarser than the cuttting member 5.

This structure with the two cutting members secured over opposed sides of the skeleton frame 3 provides in effect a hollow interior or four separate passageways or compartments 13 with the short arms of the cross-shaped frame backing the cutting members 5 and 9, as shown in FIG. 2. The outer end of the structure is open and so it is an easy expedient to shake out any filings or debris that may pass through the cutting members 5 and 9 through the open end. The cutting members themselves may easily be brushed clean of filings and debris, and if necessary the forward portion of the device may be effectively washed or sprayed with water since if the cutting members are made of stainless steel, and the skeleton frame of equivalent rust-proof material or a plastic, there can be no deterioration result from such washing. It is clear from the foregoing that the instant device may be easily and most thoroughly cleansed whenever desired.

The handle 1 is also shaped to removably hold a commonly known form of nail file 14, which may remain in place during the use of the device when cutting with either of the members 5 or 9, without any discomfort to the operator or interference with the accurate holding of the device. To this end, the upper face of the handle 1 is provided with a longitudinal recess 15 having the general contour of the nail file 14. The forward or pointed end of the recess is undercut as indicated at 16 in FIGURE 4, while the rear or broad end of the recess is also undercut as indicated at 17. In an intermediate location the handle is provided with opposed notches 18—18 extending to the full depth of the recess 15. On each side of these notches an elevation is provided in the recess in the form of a narrow longitudinal shoulder 19 which lessens the depth of the recess and maintains the intermediate portion of the nail file 14 above the bottom of the recess so that the nail file is under some tension when the front and rear ends thereof are disposed in the undercuts 16 and 17. The nail file is thus held slightly upwardly bowed and firmly against the shoulders 19 so that it remains firmly in position substantially as a fixed part of the handle 1. At the same time, it is a simple expedient for the user to insert a thumb and fingernail in the notches 18—18 beneath the body of the nail file 14, elevate the central portion of the nail file, and in effect spring it out of its engagement with the handle.

The nail file 14 may have a cutting surface on each side thereof which surfaces vary in coarseness, and the nail file may be used for finer trimming or smoothing whenever necessary.

In use, the instant invention is extremely efficient. It is a simple expedient for the user to grasp the handle 1, and manipulate one of the cutting members 5 or 9, depending upon the degree of coarseness desired, over the thickened growth of a corn, callous, or other affliction. In so doing it may be necessary for best results to use both of the cutting members 5 and 9 in order to acquire the desired degree of growth removal without pain and with adequate resulting smoothness. The nail file 14 may also be utilized to finish the operation for adequate smoothness, and especially where there is danger of irritation after a portion of the growth has been removed. After using, the device may be thoroughly cleansed in the manner above described, simply and easily. Obviously, the device is extremely durable and may be economically manufactured.

It will be understood that modifications and variations may be effected without departing from the scope of the novel concepts of the present invention.

I claim as my invention:

1. In a corn and callous file,
   (a) a handle,
   (b) a skeleton frame on said handle and having opposite edge notches,
   (c) an apertured cutting member over one side of said frame defining therewith an interior hollow open at one end, and
   (d) another similar cutting member of a degree of coarseness differing from the first said member over the other side of said frame defining therewith an identical interior hollow, both of said cutting members having edges thereof retainingly engaged in said notches and said members being curvate about equal radii outwardly convex whereby said file is symmetrical.

2. In a corn and callous file,
   (a) a skeleton frame having a cross-sectional shape of a cross,
   (b) the lateral arms of said frame each having a longitudinal notch in the free edge thereof,
   (c) a cutting member over one side of said frame with the side margins thereof turned into said notches, and
   (d) a second cutting member of a different degree of coarseness similarly mounted over the other side of said frame.

3. In a corn and callous file,
   (a) a handle,
   (b) said handle having a longitudinal recess in one side thereof,
   (c) undercut shoulders at opposite ends of said recess,
   (d) longitudinal shoulders in an intermediate part of said recess to lessen the depth thereof, and
   (e) a file removably held under stress in upwardly bowed position in said recess with its intermediate portion on said longitudinal shoulders and its ends beneath said undercut shoulders.

References Cited by the Examiner

UNITED STATES PATENTS

| | | | |
|---|---|---|---|
| 243,671 | 6/81 | Wilson | 132—75.6 |
| 250,736 | 12/81 | Ingalsbe | 29—78 X |
| 304,728 | 9/84 | Hellwig | 132—121 X |
| 454,956 | 6/91 | Levy | 132—76.4 |
| 1,418,974 | 6/22 | Rodow | 29—78 |
| 2,019,580 | 11/35 | Poux | 132—76.4 |
| 2,749,923 | 6/56 | Lindgren | 132—76.2 |
| 2,898,914 | 8/59 | Sardal | 128—304 |

FOREIGN PATENTS 666,573  2/52  Great Britain.

RICHARD A. GAUDET, *Primary Examiner.*

LOUIS J. DEMBO, JORDAN FRANKLIN, *Examiners.*